United States Patent [19]

Blackburn et al.

[11] Patent Number: 5,056,700
[45] Date of Patent: Oct. 15, 1991

[54] AUTOMOBILE MOUNTABLE BICYCLE CARRIER

[75] Inventors: James R. Blackburn, Los Gatos; Brandon A. Lee, San Mateo, both of Calif.

[73] Assignee: Blackburn Designs, Inc., Campbell, Calif.

[21] Appl. No.: 414,870

[22] Filed: Sep. 29, 1989

[51] Int. Cl.5 .............................................. B60R 9/00
[52] U.S. Cl. ...................................... 224/324; 224/321; 224/329; 224/42.03 B
[58] Field of Search ................. 224/42.03 B, 314, 324, 224/321, 329, 330, 331, 309; 211/17, 18, 22

[56] References Cited

U.S. PATENT DOCUMENTS

| 506,495 | 10/1893 | Hart, Jr. | 211/22 |
| 511,367 | 12/1893 | Slater | 211/22 |
| 562,520 | 6/1896 | Fonda | 211/22 |
| 577,910 | 3/1897 | Bierbach | 211/22 |
| 580,032 | 4/1897 | Bierbach | 211/18 |
| 3,921,869 | 11/1975 | Rogers | 224/42.03 B |
| 4,116,341 | 9/1978 | Hebda | 224/42.03 B |
| 4,452,385 | 6/1984 | Prosen | 224/42.03 B |

FOREIGN PATENT DOCUMENTS

| 98850 | 3/1940 | Sweden | 224/42.03 B |

Primary Examiner—Linda J. Sholl
Attorney, Agent, or Firm—Rosenblum, Parish & Bacigalupi

[57] ABSTRACT

An automobile mountable bicycle carrier that is mounted to the trunk portion of an automobile. The carrier has rearwardly extending arms which have bicycle frame attachment brackets engaged thereto. Two brackets are disposed to hold each bicycle frame, one bracket holding the top tube and the other bracket holding the seat tube. The bracket which holds the seat tube preferably also holds the top tube.

22 Claims, 5 Drawing Sheets

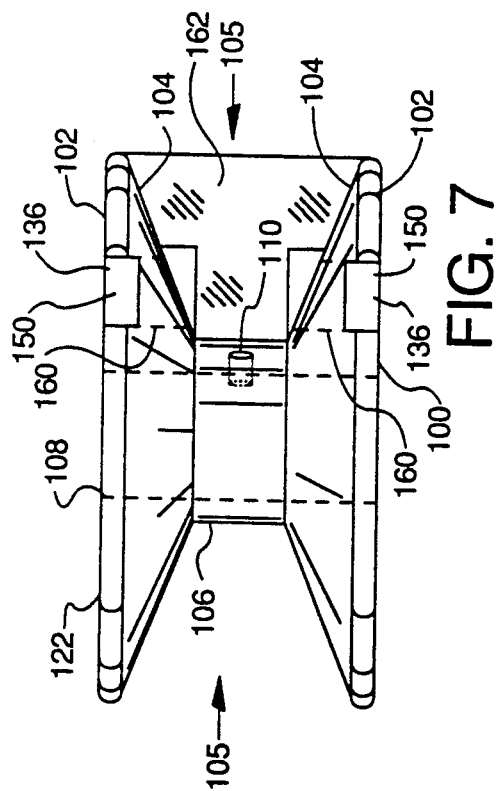

AUTOMOBILE MOUNTABLE BICYCLE CARRIER

BACKGROUND OF THE INVENTION

1. Field of the Invention

The present invention relates to devices for carrying bicycles, and more particularly to a device for carrying bicycles that is mountable upon the trunk portion of an automobile.

2. Description of the Prior Art

The bicycle rider often desires to transport his bicycle by automobile to a starting location for a bicycle ride. Transporting bicycles within the interior of an automobile can be difficult and can soil the interior of the automobile. Thus, devices for carrying bicycles on the exterior of automobiles have been developed. Some such devices carry bicycles on the top of a car, whereas other such devices carry the bicycles upon the trunk of a car. The present invention is a device for carrying bicycles upon the trunk of a car.

Typical prior art devices for carrying bicycles upon the trunk of a car possess a generally V-shaped frame (when viewed from the side) which is attached to the trunk of the car utilizing flexible straps having attachment clips at the distal ends thereof. Two bicycle carrying arms may project outwardly from the frame for the placement of the bicycles thereon. Some arms are formed with notches for locating the bicycles thereon, while other arms may have an elastic cord that holds the bicycles to the arms.

A problem with the prior art carriers is that the bicycles hang down from the arms in a relatively loose manner. That is, the bicycles are free to slide on the arms, and to pivot about the arm holding points. When one bicycle is carried, its movement on the carrier may cause it to contact the exterior of the automobile, which may damage the bicycle and/or the automobile. When two bicycles are carried on a single carrier, the relative movement of the bicycles may cause them to contact each other, as well as the automobile, thus resulting in damage.

SUMMARY OF THE INVENTION

It is an object of the present invention to provide an automobile mountable bicycle carrier that will hold a bicycle in a relatively fixed position.

It is another object of the present invention to provide an automobile mountable bicycle carrier that provides a mounting bracket which holds a bicycle firmly to the arms of the carrier.

It is a further object of the present invention to provide an automobile mountable bicycle carrier that substantially prevents a bicycle mounted thereon from movement that may cause damage to the bicycle or the automobile.

The automobile mountable bicycle carrier of the present invention has a generally V-shaped frame when viewed from the side that is mounted to the trunk of a car utilizing attachment straps. A U-shaped bicycle mounting member projects from the frame for carrying the bicycles thereon. Bicycle mounting brackets are disposed upon each arm of the U-shaped bicycle mounting member to hold the bicycle frame in a relatively fixed position. One bracket on one arm engages the bicycle frame proximate the engagement point of the seat tube with the top tube. Another bracket disposed upon the other arm engages the bicycle frame along the top tube.

In the preferred embodiment, each bracket is generally formed as a pair of spaced-apart, semi-circular disks that taper away from each other in their radial projection from a central joinder together. The tubes of the bicycle fit snugly within the relatively V-shaped taper of the two disks of each mounting bracket, and velcro straps are utilized to firmly hold the bicycle tube within each bracket. The brackets therefore provide a firm attachment mechanism for the bicycles which prevent sliding and pivotal movement of the bicycle, thus preventing the carried bicycles from striking each other or the body of the automobile.

It is an advantage of the present invention that it provides an automobile mountable bicycle carrier that will hold a bicycle in a relatively fixed position.

It is another advantage of the present invention that it provides an automobile mountable bicycle carrier that provides a mounting bracket which holds a bicycle firmly to the arms of the carrier.

It is a further advantage of the present invention that it provides an automobile mountable bicycle carrier that substantially prevents a bicycle mounted thereon from movement that may cause damage to the bicycle or the automobile.

The foregoing and other objects, features and advantages of the present invention will be apparent from the following detailed description of the preferred embodiment which makes reference to the drawing.

IN THE DRAWING

FIG. 4 is a side elevational view of a rear mounting bracket of the present invention;

FIG. 5 is a top plan view of the rear mounting bracket depicted in FIG. 4;

FIG. 6 is a side elevational view of a front mounting bracket of the present invention; and FIG. 7 is a top plan view of the front mounting bracket depicted in FIG. 6.

DESCRIPTION OF THE PREFERRED EMBODIMENT

Figure 1:
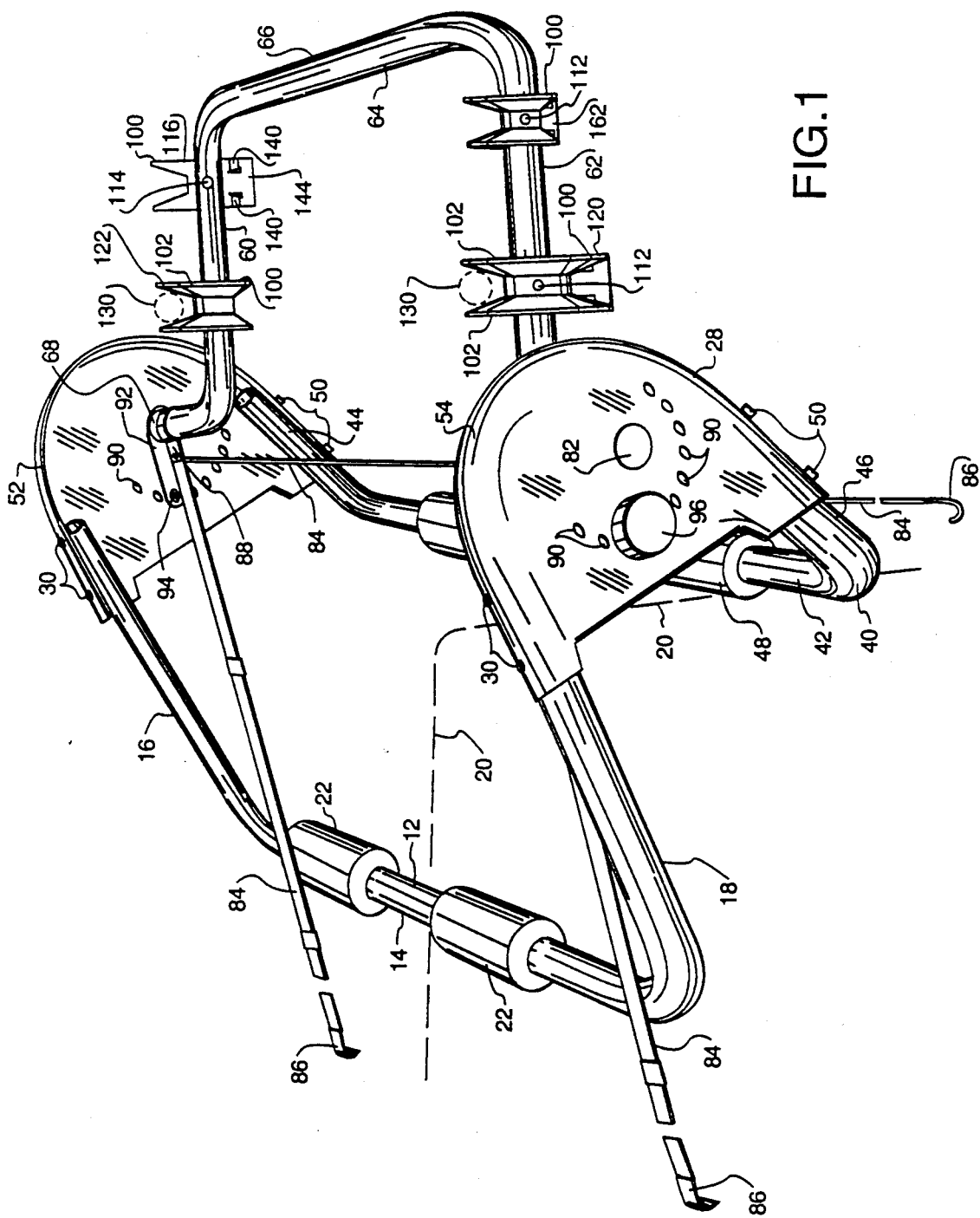
FIG. 1 is a perspective view of the automobile mountable bicycle carrier of the present invention.
Figure 2:
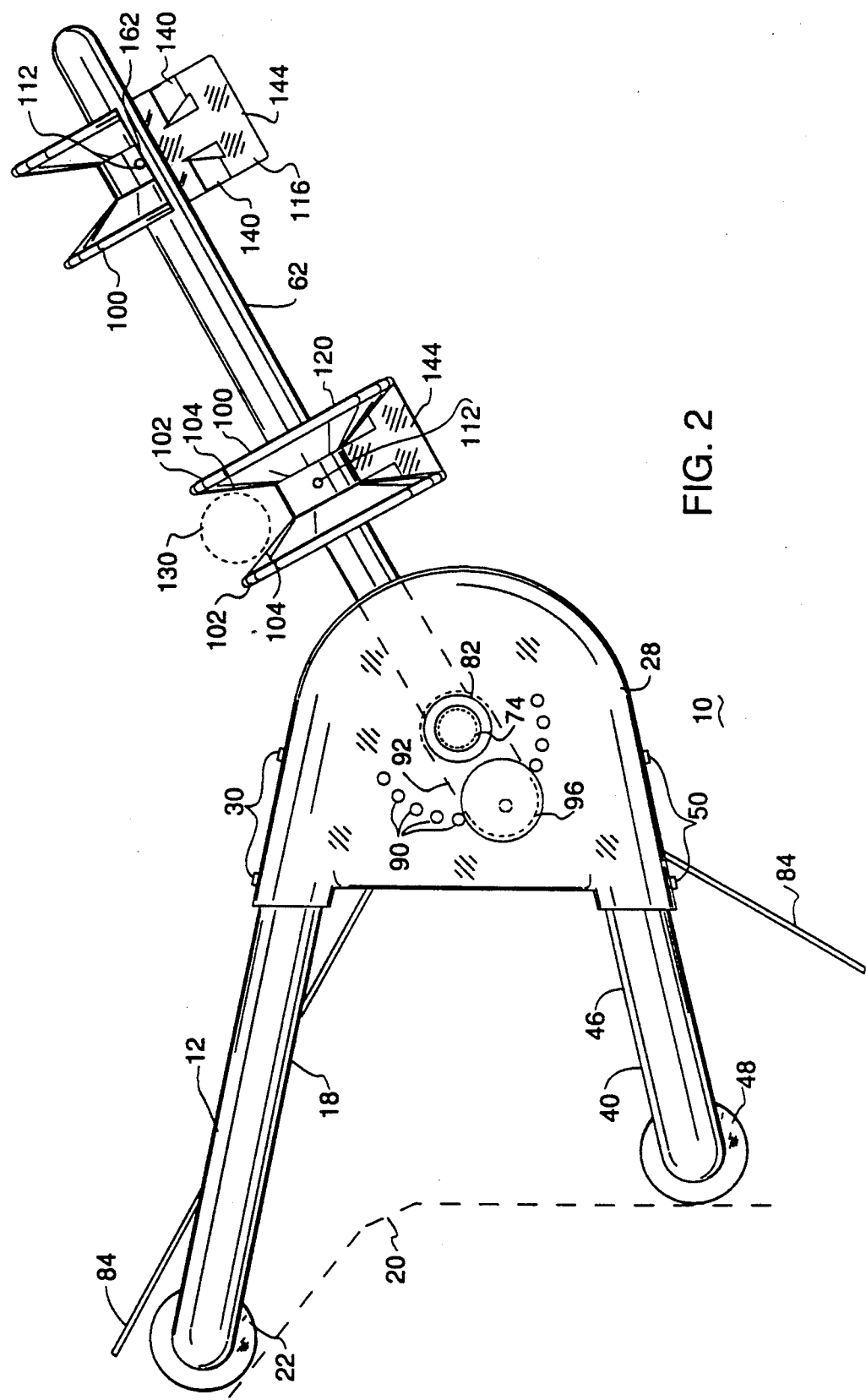
FIG. 2 is a side elevational view of the present invention.
Figure 3:
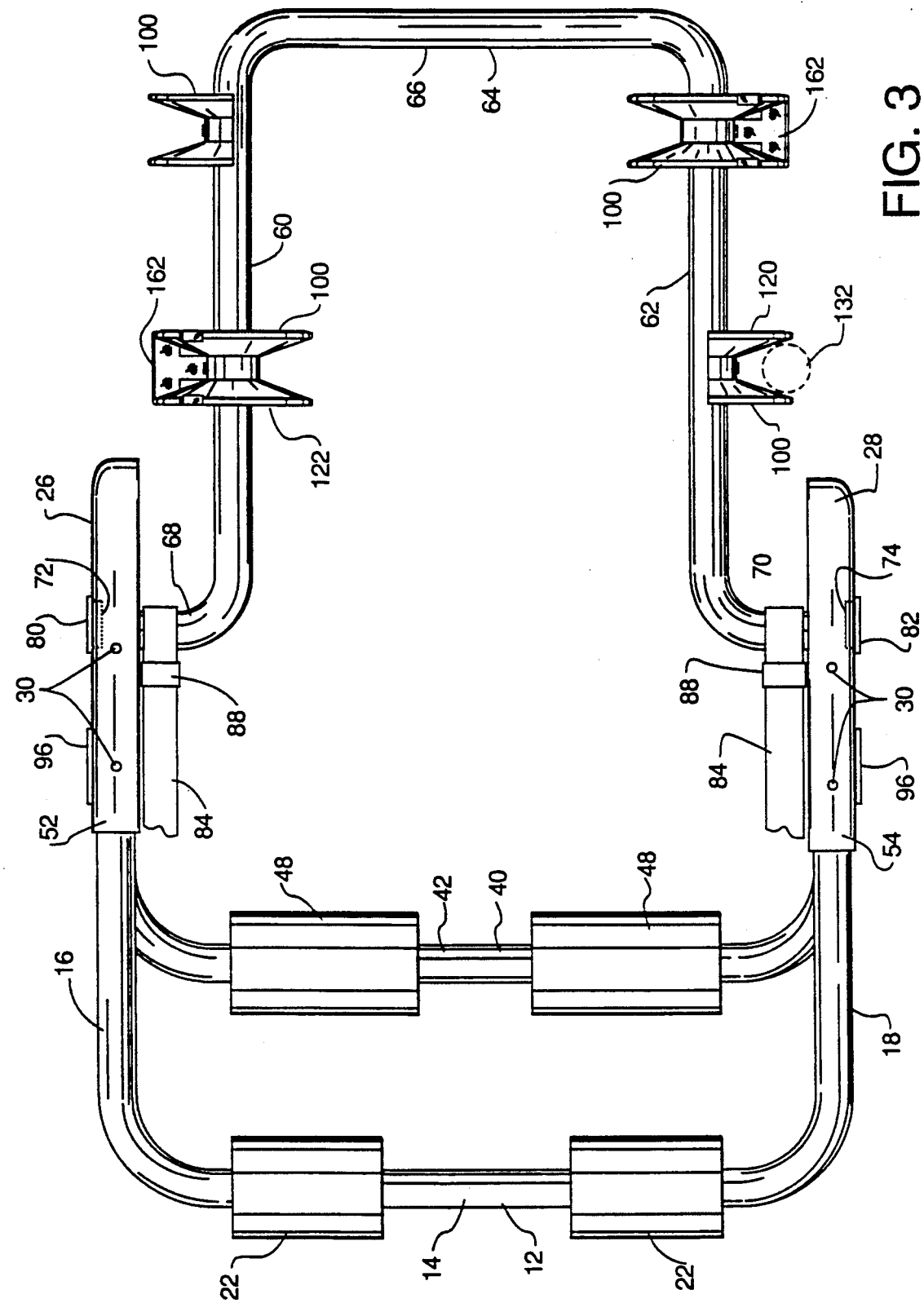
FIG. 3 is a top plan view of the present invention.

The automobile mountable bicycle carrier 10 of the present invention is generally depicted in FIGS. 1, 2 and 3. The frame of the carrier 10 is generally V-shaped when viewed from the side, although one leg of the "V" is shorter than the other. The frame of the carrier 10 includes a generally U-shaped upper automobile trunk contact member 12 having a base segment 14 and two arm segments 16 and 18. The base segment 14 is disposed to make contact with the upper portion of the trunk of an automobile 20 shown generally as a dotted line in FIGS. 1 and 2. Two cylindrical cushions 22 are engaged to the base segment 14 to prevent damage to the exterior surface of the trunk 20 of the automobile. The arm segments 16 and 18 of the upper frame member 12 project away from the trunk 20, and the outer end of each arm segment 16 and 18 is joined to a frame plate 26 and 28, respectively, utilizing engagement bolts 30.

The frame of the carrier 10 also includes a generally U-shaped lower automobile trunk engagement member 40. The lower member 40 includes a base segment 42 and two arm segments 44 and 46. Two generally cylindrical cushions 48 are engaged to the base segment 42 to minimize damage to the exterior surface of the trunk 20 of the automobile. The arm segments 44 and 46 of the lower frame member 40 extend away from the trunk 20, and the outer end of each arm segment 44 and 46 is engaged to the frame plate 26 and 28, respectively, utilizing bolts 50. In the preferred embodiment, each frame plate 26 and 28 is formed with a projecting lip 52 and 54, respectively, along the outer edge of the frame plate that is shaped to wrap partially around the ends of the projecting arm segments 16, 18, 44 and 46 to enhance the strength of the bolted engagement of the arm segments 16, 18, 46 and 48 with the frame plates 26 and 28.

Two bicycle mounting arms 60 and 62 extend outwardly from the frame plates 26 and 28, respectively. In the preferred embodiment, the two arms 60 and 62 comprise the arm segments of a generally U-shaped bicycle mounting member 64 having a base segment 66. The base segment 66 joins the arms 60 and 62 together to provide added strength to the bicycle-mounting member 64.

It is important that a bicycle carrier such as the present invention be adjustable regarding the angle at which the bicycle mounting arms 60 and 62 extend from the frame, because the carrier 10 will be engaged to automobiles having differing trunk configurations and slopes. To provide such adjustability, the arms 60 and 62 are pivotally engaged to the frame plates 26 and 28, respectively. In the preferred embodiment, the inward ends 68 and 70 of the arms 60 and 62, respectively, are bent outwardly at approximately a 90 degree angle to pass through a hole 72 and 74, respectively, formed through the frame plates 26 and 28, respectively. An end cap 80 and 82 is engaged to the ends of the arm segments 68 and 70, respectively, at the outer side of the penetration of the arm segments 68 and 70 through the holes 72 and 74. The diameter of the end caps 80 and 82 is larger than the diameter of the holes 72 and 74, such that the end segments 68 and 70 are prevented from sliding back through the holes 72 and 74. It is therefore to be realized that the arm segments 68 and 70 are rotatably engaged within the holes 72 and 74, respectively, and that the bicycle mounting member 64 is thereby pivotally engaged to the frame plates 26 and 28.

The device 10 is attached to an automobile utilizing adjustable, flexible straps 84 that have curved metal clips 86 engaged to their ends. In the preferred embodiment two straps 84 are joined to each of the two end segments 68 and 70 of the arms 60 and 62 utilizing a buckle 88 to facilitate the joinder of the straps 84 with the end segments 68 and 70. One strap 84 from each buckle 88 proximate each end segment 68 and 70 is disposed such that the clips 86 may be engaged in the upper seam of the trunk of the automobile. The other strap 84 from each end segment 68 and 70 projects downwardly such that the clips 86 may be engaged to the lower edge of the trunk of the automobile.

A plurality of selectively fixed mounting orientations for the bicycle mounting member 64 are provided through a series of mounting holes 90 formed through the frame plates 26 and 28. In the preferred embodiment, a pivot flange 92 is fixedly engaged to each arm segment 68 and 70 proximate the rotatable engagement point of the arm segments 68 and 70 with the pivot holes 72 and 74. Each pivot flange 92 extends radially from the arm segment 68 and 70 and has a threaded hole 94 formed therethrough proximate its outer end. The hole 94 may be aligned with any of the plurality of mounting holes 90 formed through the frame plates 26 and 28. A threaded mounting hole engagement bolt 96 is provided to pass through a selected mounting hole 90 and become threadably engaged in the threaded pivot flange hole 94, whereby the bicycle mounting member 64 may be selectively, pivotally oriented and fixed with respect to the frame plates 26 and 28.

Bicycle mounting brackets 100 are engaged to the arms 60 and 62 of the bicycle mounting member 64. As can be seen with the aid of FIGS. 4, 5, 6 and 7, each bracket 100 is semi-circular in a side elevational view (see FIGS. 4 and 6). From a top plan view of the bracket 100 (see FIGS. 5 and 7) it is seen that each bracket may be thought of as including a pair of semi-circular disks 102, each having an inwardly tapering face 104 which joins a central semi-cylindrical base 106, whereby a relatively "V" shaped trough 105 is created. A cutout portion 108 is formed in the base 106 to facilitate the engagement of the brackets 100 with the arms 60 and 62. A mounting hole 110 is formed through the base 106 to facilitate the engagement of the brackets 100 to the arms 60 and 62 utilizing bolts 112 which engage threaded holes 114 formed in the arms 60 and 62 at the appropriate locations for mounting the brackets 100. A flat face 116 forms the lower surface of the bracket 100.

In the preferred embodiment, two mounting brackets 100, one of which is disposed on each mounting arm 60 and 62, are utilized to carry a single bicycle. To facilitate the mounting of a bicycle upon the carrier, as is seen with the aid of FIG. 8, a first bracket 120 is engaged to the mounting arm 62 such that the flat face 116 of the bracket 120 is oriented vertically and the disk elements 102 are oriented outwardly of the bicycle mounting member 64. The second mounting bracket 122 for the bicycle is engaged to the mounting arm 60 such that the flat face 116 of the bracket 122 is oriented horizontally and the disk elements 102 of the bracket 122 are oriented upwardly of the bicycle mounting member 64. A bicycle is properly mounted within the two brackets 120 and 122 by placing the top tube 130 (shown in phantom in FIGS. 1 and 2) within the V-shaped trough 105 between the two disk elements 102 of each bracket 120 and 122, such that the tube 130 makes a snug contact with the tapering faces 104 of each bracket 120 and 122. The bicycle is further properly installed within the brackets when the bicycle frame is further positioned such that the seat tube 132 (shown in phantom in FIG. 3) is snugly engaged within the V-shaped trough 105 between the inwardly tapering faces 104 of the bracket 120.

It will therefore be appreciated that bracket 120 may be thought of as the rear mounting bracket, in that its position and function is to snugly engage both the seat tube and the top tube of the bicycle frame, whereas the bracket 122 may be termed the front bracket in that it engages only the top tube in a location toward the front of the bicycle frame. To secure the engagement of the bicycle frame within the rear bracket 120 and front bracket 122, velcro attachment bands 134 are utilized. To facilitate the utilization of the velcro attachment bands 134, notches 136 are formed in the mounting brackets 120 and 122, and, due to the differing orientations and usages of the brackets 120 and 122, the notches 136 are formed in different orientations in the brackets 120 and 122, whereby the rear mounting bracket 120 and front mounting bracket 122 differ with regard to the location of the notches 136.

Figure 8:
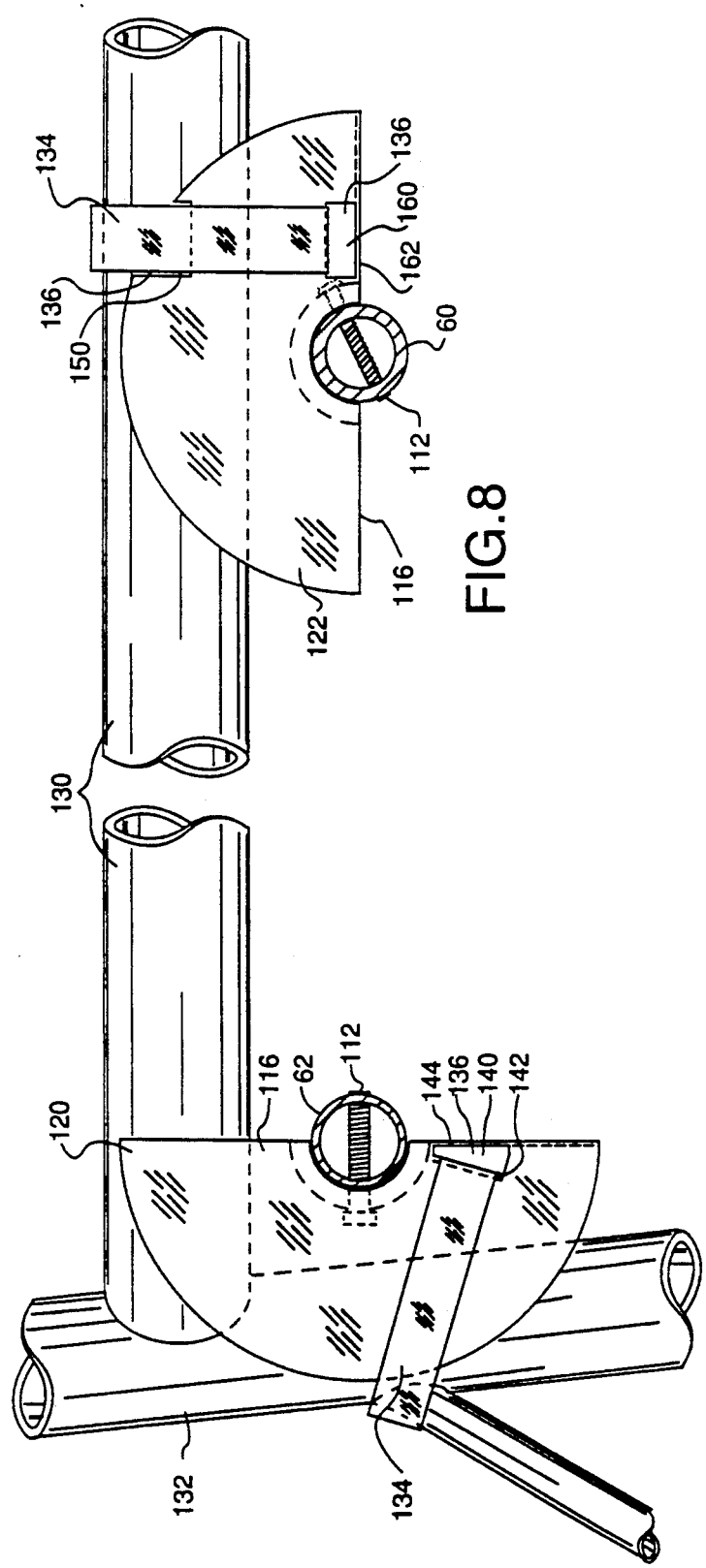
FIG. 8 is a side elevational view depicting a bicycle frame engaged within the mounting brackets of the present invention.

As is depicted in FIGS. 4, 5 and 8 regarding the rear mounting bracket 120, a notch 140 is formed proximate the flat surface 116 of each disk element 102. The notch 140 is formed with an angled inner edge 142 to facilitate the angular orientation of the velcro strap 134 which passes therethrough to hold the seat tube 132 within the bracket 100. A segment 144 of the flat face 116 may be retained across the opening between the disk elements 102 to act as a holder of a loosened velcro strap when a bicycle is being mounted within the bracket.

In the preferred embodiment, the front bracket 122, see FIGS. 6, 7 and 8, is formed with two notches 150 and 160, each of which serves to promote the attachment of the top tube 130 by a velcro strap 134 which passes through the notches 150 and 160. Notch 150 is formed downwardly in the outer curved surface of each disk element 102 of the bracket 122. Notch 160 is formed in the flat face 116 of each disk element 102 of the bracket 122. As was pointed out regarding notch 140, a segment 162 of the face 116 may be retained between the disk elements 102 to act as a strap holder, such that a loosened velcro strap will be retained within the bracket during the mounting and dismounting of the top tube of a bicycle within the front bracket 122.

As depicted in FIGS. 1, 2 and 3, and stated hereinabove, the frame 10 is designed to carry two bicycles. Due to the projecting handlebars of a bicycle, the mounting of two bicycles on the carrier requires that the two bicycles be mounted facing in opposite directions. Thus, the mounting brackets 100 for a first bicycle are reversed for a second bicycle; each arm 60 and 62 therefore has a rear mounting bracket 120 and a front mounting bracket 122 engaged thereto.

The mounting brackets 120 and 122 function to prevent the lateral and pivotal motion of a bicycle frame that is mounted in the brackets. The primary function of the front bracket 122 is to hold the top tube and prevent its lateral motion along the surface of arm 60. The principal function of the rear bracket 120 is to prevent the pivotal motion of a bicycle frame mounted therein through its contact with the seat tube 132. Because the contact point of the rear mounting bracket 120 with the seat tube 132 is below the contact point of the top tube 130 with the rear bracket 120, the pivotal motion of the bicycle frame that might otherwise exist is restrained. It is therefore within the contemplation of the inventors and within the spirit and scope of the claims set forth hereinafter that the front mounting bracket 122 could be relatively effectively replaced by two pins that project upwardly from the arm 60 in a V shape or even vertically to hold the top tube 130 therebetween against lateral motion along the arm 60. In a like manner, the rear mounting bracket 120 could be relatively effectively replaced by two pins which project horizontally outwardly from the arm 62 in a V configuration, or even as parallel pins, such that the pins would make contact with the seat tube 132 held therebetween below the pivot axis of the frame upon the arm 62, whereby the pivotal motion of the frame would be restrained.

While the invention has been particularly shown and described with reference to certain preferred embodiments, it will be understood by those skilled in the art that various alterations and modifications in form and detail may be made therein. Accordingly, it is intended that the following claims cover all such alterations and modifications as may fall within the true spirit and scope of the invention.

What I claim is:

1. An automobile mountable bicycle carrier, comprising:
   a frame;
   an automobile attachment means being joined to said frame for the removable mounting of said frame to the outside body of an automobile;
   a bicycle engagement means being joined to said frame, said bicycle engagement means including two arm members;
   at least one bicycle attachment means being engaged to each said arm member, each said bicycle attachment means being adapted to releasably, fixedly hold at least one tube of a bicycle frame; and
   wherein one said bicycle attachment means is disposed upon one said arm member to hold the top tube of said bicycle frame, and another said bicycle attachment means is disposed upon the other of said arm members to simultaneously hold both the top tube and the seat tube of said bicycle frame.

2. An automobile mountable bicycle carrier as described in claim 1 wherein two of said bicycle attachment means are engaged to each of said arm members.

3. An automobile mountable bicycle carrier as described in claim 2 wherein one of said two bicycle attachment means disposed on one of said arm members is configured to hold the top tube of said bicycle frame, and the other of said two bicycle attachment means disposed upon said arm member is configured to simultaneously hold both the top tube and the seat tube of said bicycle frame.

4. An automobile mountable bicycle carrier as described in claim 1 wherein a first end of each said arm member is joined to said frame, and a second end of each said arm member is engaged to a mutual support member.

5. An automobile mountable bicycle carrier as described in claim 4 wherein said two arm members and said mutual support member are integrally formed as a "U-shaped member".

6. An automobile mountable bicycle carrier, comprising:
   a frame;
   an automobile attachment means being joined to said frame for the removable mounting of said frame to the outside body of an automobile;
   a bicycle engagement means being joined to said frame, said bicycle engagement means including two arm members;
   at least one bicycle attachment means being engaged to each said arm member, each said bicycle attachment means being adapted to releasably, fixedly hold at least one tube of a bicycle frame;
   wherein each said bicycle attachment means includes a relatively V-shaped trough formed therein for the placement and holding of at least one tube of said bicycle frame; and
   wherein one said bicycle attachment means is disposed upon one said arm member to hold the top tube of said bicycle frame, and another said bicycle attachment means is disposed upon the other of said arm members to simultaneously hold both the top tube and the seat tube of said bicycle frame.

7. An automobile mountable bicycle carrier as described in claim 6 wherein each said bicycle attachment means further includes a flexible strap for the releasable holding of a tube of said bicycle frame therein.

8. An automobile mountable bicycle carrier as described in claim 6 wherein two of said bicycle attachment means are engaged to each of said arm members, and wherein one of said two bicycle attachment means disposed on one of said arm members is configured to hold the top tube of said bicycle frame, and the other of said two bicycle attachment means disposed upon said arm member is configured to simultaneously hold both the top tube and the seat tube of said bicycle frame.

9. An automobile mountable bicycle carrier as described in claim 6 wherein a first end of each said arm member is joined to said frame, and a second end of each said arm member is engaged to a mutual support member.

10. An automobile mountable bicycle carrier as described in claim 9 wherein said two arm members and said mutual support member are integrally formed as a "U-shaped member".

11. An automobile mountable bicycle carrier, comprising:
a frame, said frame including an upper substantially U-shaped member that is disposed for making physical contact with portions of the trunk of an automobile;
said frame also including a lower substantially U-shaped member that is disposed for making physical contact with other portions of said trunk of said automobile;
an automobile attachment means being joined to said frame for the removable mounting of said frame to the trunk of an automobile;
a bicycle engagement means being joined to said frame, said bicycle engagement means including two arm members;
at least one bicycle attachment bracket being engaged to each said arm member, each said bicycle attachment bracket being adapted to releasably, fixedly hold at least one tube of a bicycle frame; and
wherein one said bicycle attachment bracket is disposed upon one said arm member to hold the top tube of said bicycle frame, and another said bicycle attachment bracket is disposed upon the other of said arm members to simultaneously hold both the top tube and the seat tube of said bicycle frame.

12. An automobile mountable bicycle carrier as described in claim 11 wherein each said bracket includes two spaced-apart, semi-circular disk elements and a semi-cylindrical element disposed between said disk elements, the radius of said semi-circular disks being greater than the radius of said semi-cylindrical elements, such that a trough is created between said disks.

13. An automobile mountable bicycle carrier as described in claim 12 wherein said trough has two sides, each side being formed by the surface of one of said two disks, and wherein said sides of said trough diverge outwardly, such that said trough is relatively V-shaped; and
wherein said V-shaped trough is configured such that each said side of said trough will frictionally engage the outer surface of each said tube of said bicycle frame that is disposed therein.

14. An automobile mountable bicycle carrier as described in claim 13 wherein one said bracket is disposed upon one said arm member to hold the top tube of said bicycle frame, and another of said brackets is disposed upon the other of said arm members to simultaneously hold both the top tube and the seat tube of said bicycle frame within said V-shaped trough.

15. An automobile mountable bicycle carrier as described in claim 14 wherein each said bracket further includes a flexible strap for the releasable holding of a tube of said bicycle frame therein.

16. An automobile mountable bicycle carrier as described in claim 15 wherein two of said brackets are engaged to each of said arm members.

17. An automobile mountable bicycle carrier as described in claim 16 wherein one of said brackets disposed upon one of said arms is configured to hold the top tube of said bicycle frame, and the other of said two brackets disposed upon said arm member is configured to simultaneously hold both the top tube and the seat tube of said bicycle frame.

18. An automobile mountable bicycle carrier as described in claim 17 wherein a first end of each said arm member is joined to said frame, and a second end of each said arm member is engaged to a mutual support member.

19. An automobile mountable bicycle carrier as described in claim 18 wherein said two arm members and said mutual support member are integrally formed as a "U-shaped member".

20. An automobile mountable bicycle carrier as described in claim 13 wherein each said side of said V-shaped trough of said bicycle attachment bracket that is adapted to releasably hold said seat tube of said bicycle frame is configured to frictionally engage the outer surfaces of both said seat tube and said top tube of said bicycle frame that is disposed therein.

21. An automobile mountable bicycle carrier as described in claim 11 wherein a first end of each said arm member is joined to said frame, and a second end of each said arm member is engaged to a mutual support member.

22. An automobile mountable bicycle carrier as described in claim 21 wherein said two arm members and said mutual support member are integrally formed as a "U-shaped member".

* * * * *